United States Patent [19]

Motsko

[11] Patent Number: 4,621,895

[45] Date of Patent: Nov. 11, 1986

[54] REFLECTIVE/REFRACTIVE/REFLECTIVE PRECISION CONNECTOR, (MR3PC)

[76] Inventor: Gerard J. Motsko, 14898 Easingwold Dr., Houston, Tex. 77015

[21] Appl. No.: 617,227

[22] Filed: Jun. 4, 1984

[51] Int. Cl.<sup>4</sup> ............................................. G02B 6/38
[52] U.S. Cl. ............................... 350/96.21; 350/96.15
[58] Field of Search ............... 350/96.15, 96.18, 96.19, 350/96.20, 96.21, 96.22, 96.16

[56] References Cited

U.S. PATENT DOCUMENTS

| 3,870,396 | 3/1975 | Racki et al. | 350/96.16 |
| 4,182,017 | 1/1980 | Ford et al. | 350/96.21 X |
| 4,306,765 | 12/1981 | Winzer et al. | 350/96.16 |
| 4,339,290 | 7/1982 | Winzer et al. | 350/96.16 X |
| 4,422,715 | 12/1983 | Williams et al. | 350/96.20 |

FOREIGN PATENT DOCUMENTS

| 2534699 | 4/1984 | France | 350/96.15 |
| 56-161504 | 12/1981 | Japan | 350/96.15 |

*Primary Examiner*—John Lee

[57] ABSTRACT

A connector to join like optical fiber waveguides in a manner designed to eliminate power losses at the connector resulting from misalignment or separation of the optical fiber end surfaces and/or resulting from dimensional differences in the respective diameters of the waveguide core and cladding which are inherent in the manufacturing process of like optical fibers and/or resulting from contamination of the end surfaces of the optical fibers during the joining process. Elimination of power losses within a connector from the above stated causes is achieved by aligning the cables to be joined within the connector and thereafter preventing movement of the optical fibers prior to endface cutting and during all subsequent joining operations, by precise targeting of each optical fiber port centerline with the center of its respective connector reflecting surface, by providing means to achieve a tight flush fit between the fiber end faces and the connector internal light transmitting components, by causing a slight convergence of the lightwave during its travel through the connector and by preventing human contact with the cable endfaces during the joining process.

3 Claims, 5 Drawing Figures

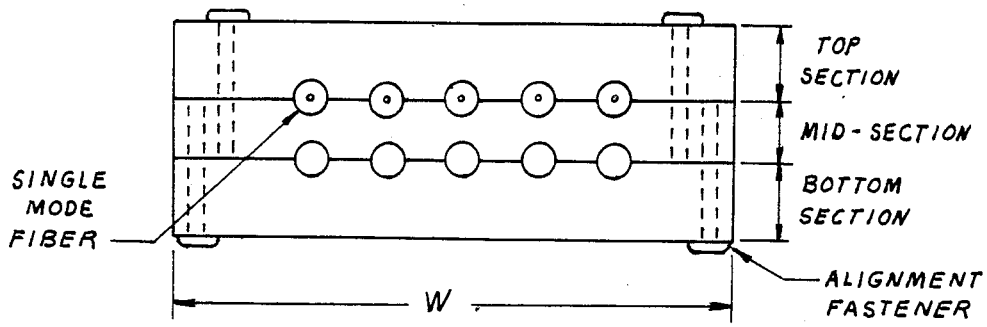
FIGURE 2
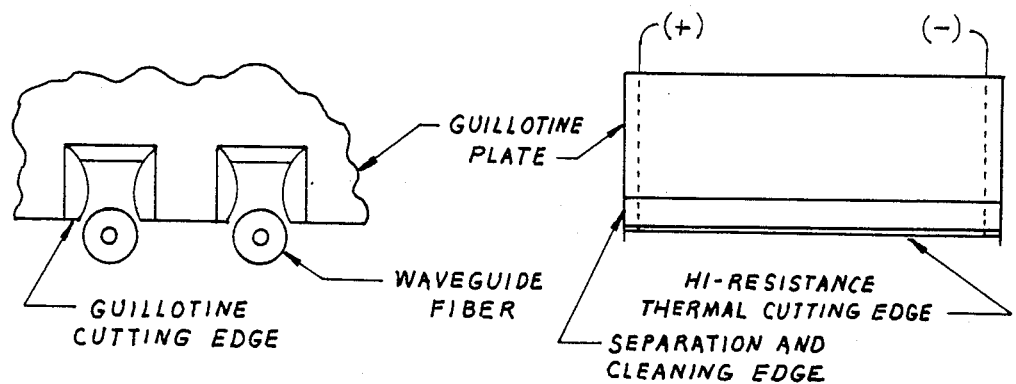
FIGURE 3
FIGURE 4
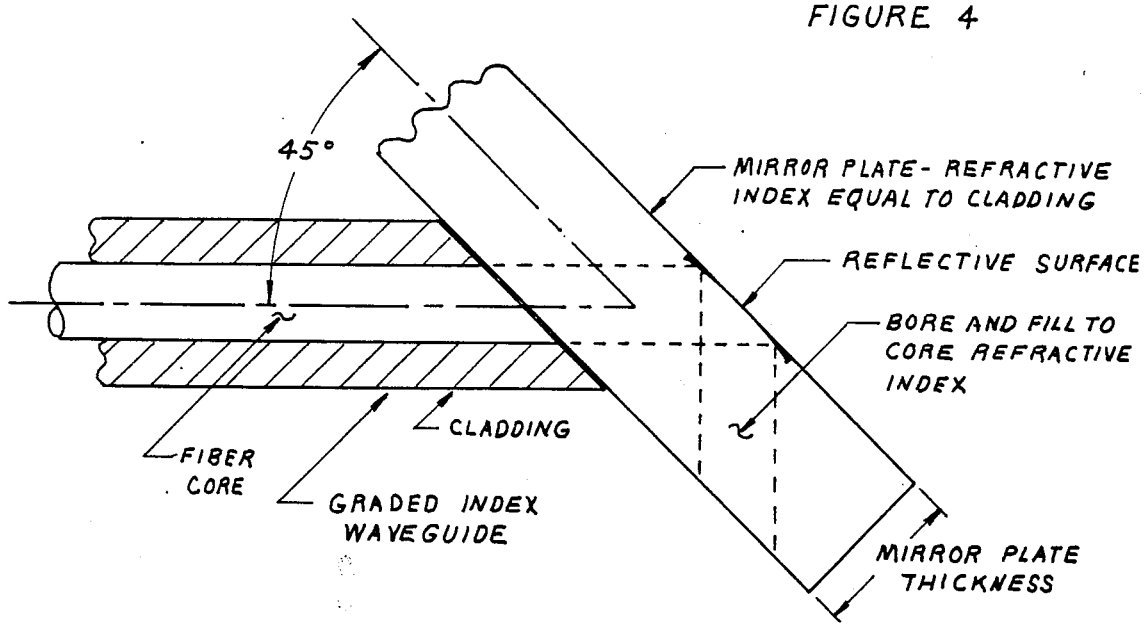
FIGURE 5

4,621,895

REFLECTIVE/REFRACTIVE/REFLECTIVE PRECISION CONNECTOR, (MR3PC)

CROSS REFERENCE

Used to connect waveguides in optical telecommunications systems.

The MR3PC is designed to connect all types of optical waveguides which includes multi-mode graded index fiber and multi-mode step index fiber; however, the most significant application is in the connection of single mode step index fibers because these fibers have an extremely small core diameter by comparison. Single mode fibers are difficult to handle and align during splicing operations.

SUMMARY

A major problem encountered in connecting optical fibers to optical system transmitters, regenerators, receivers and other optical fibers concerns the cleanliness, alignment, air gap separations and small manufacturing dimensional variations within the fiber cables.

This is especially prevalent with single-mode fibers which have a core diameter of approximately 5 micrometers. Joining such fine elements in the field requires extreme technical skill, complicated and sensitive equipment and at best, results in system power losses exceeding 8.2 decibels per connection.

In a long haul system requiring many regenerator stations and many fiber connections, the overall system power losses through the connections can be substantial. A low-loss or no-loss connector would benefit the system by allowing for fewer regenerating stations.

The MR3PC is designed to very precise factory specifications to provide a connector assembly that will require little field precision to install, will result in negligible connector power loss and will provide the potential of system gain in that the beam of light entering the output fiber narrows to a smaller cross section than that of the input fiber and therefore the light beam can enter an output fiber of smaller diameter.

DESCRIPTION OF DRAWINGS

The MR3PC is described in five related figures on the two drawings included.

The drawings are not to scale and do not show the size or configuration of an actual connector, but rather illustrate the important principles of the design.

FIG. 2 depicts the width (W) of the connector and shows 5 single-mode fibers in place, as an example. The number of fibers is optional and the number selected essentially determines the width of the connector. FIG. 2, as well as FIG. 1, shows that the connector consists of 3 sections: top, mid and bottom.

FIGS. 3 and 4 depict various type guillotines that can be employed to obtain a precise clean cut of the optical fibers and this will be discussed further in the detailed description.

FIG. 5 shows how the concepts set forth in the design for single-mode fibers can also be used for graded index and multi-mode fibers.

DETAILED DESCRIPTION

Figure 1:
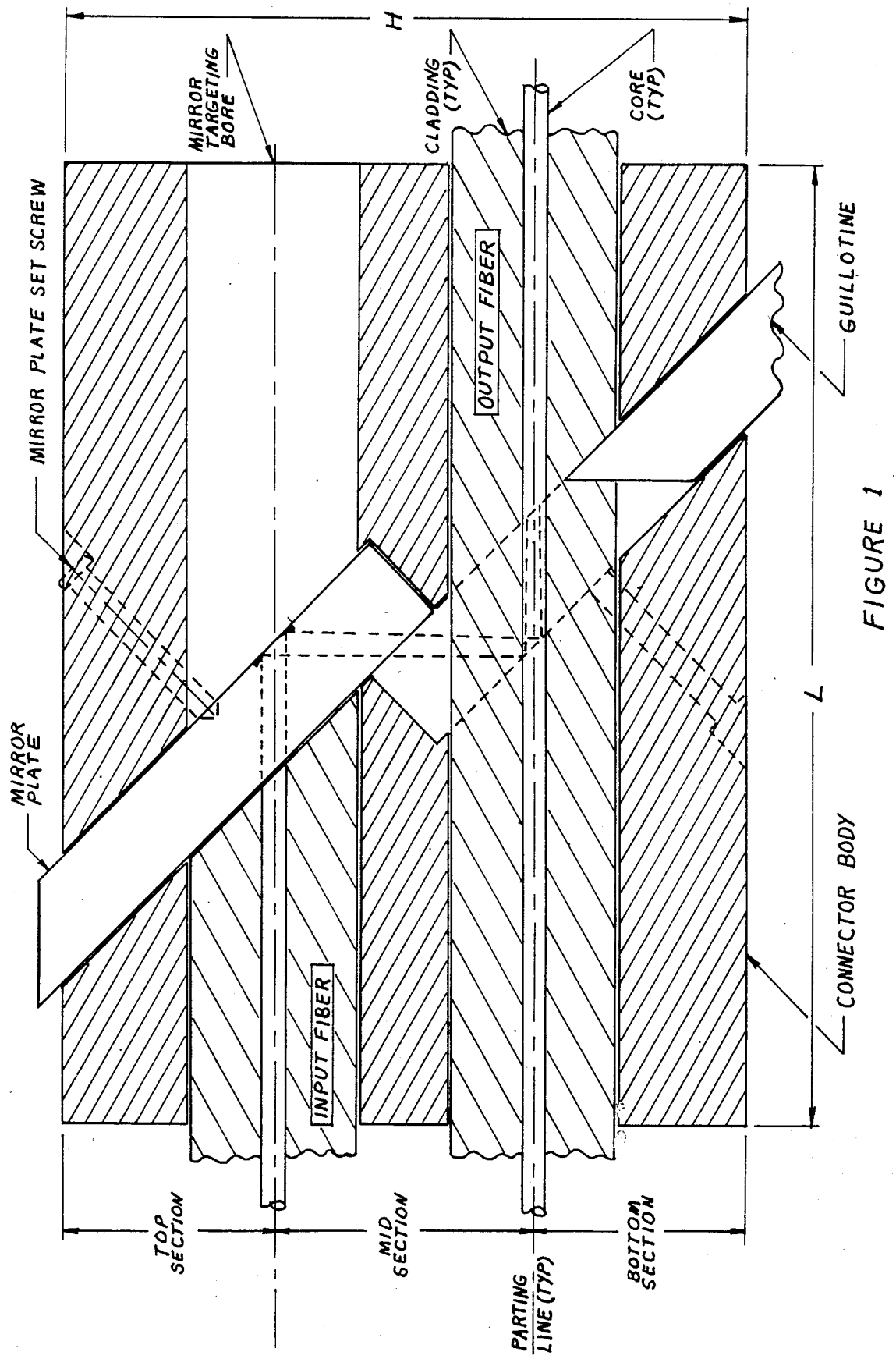
FIG. 1 shows a detailed cross-section of the MR3PC with an input single-mode fiber entering on the upper left. The upper section of the connector is shown with the mirror plate in position. The lower section of the connector is shown with an output single-mode fiber in place and the guillotine positioned at the start of the cutting operation. The cross-section depicts the height (H) and length (L) of the connector.

The MR3PC employs the principles of reflection, refraction and reflection of a light beam in a device of sufficient dimensional precision to allow the incoming beam of light to be precisely targeted to each optical reflecting surface, narrowed, and pointed directly at the core of the outgoing optical waveguide. The dotted lines in the mid-section of FIG. 1 show the path that the light beam takes through the connector when both mirror plates are installed.

As shown in FIGS. 1 and 2, the connector block or body consists of three sections: top, mid and bottom. The connector block can be fabricated from any material, (such as aluminum, steel or plastic), which lends itself to precise machining, casting or other manufacturing methods.

Preparing The Connector Body

The connector body can be cut into three sections from a single block of material or fabricated from three separate blocks and finished within tolerance to the dimensions called out by the design. (Methods such as precision casting can be used to fabricate the three sections with fiber holes, mirror plate slots and parting lines formed in place to design specifications). The length of the connector is not critical and can be established by the manufacturer to benefit ease of handling, cost, and etcetera. The width of the connector is dependent on the number of waveguide fibers that are to be joined and the method of fastening the three connector sections together as shown in FIG. 2. The height of the connector is critical with respect to the mid-section only, and therefore, the overall height is also applicable to manufacturer discretion concerning ease of handling, cost, or other criteria.

The mid-section height is determined in design by the thickness and angle of the mirror plate selected. As the mirror plate increases in thickness, the height of the mid-section increases. For example; if the mirror plate is 1.8 millimeter thick, the height of the mid-section will be approximately 2.75 millimeters. If the thickness of the mirror plate is doubled to 2.0 millimeters, the height of the mid-section will also double to approximately 5.5 millimeters.

The thickness of the mirror plate is illustrated in FIG. 5 and, within limits, can be determined by the manufacturer to benefit ease of handling, cost, or other criteria.

The mid-section height is also dependent on the mirror plate angle which is defined as the angle between the surface plane center line of the mirror plate and the center line or axis of the fiber core. FIGS. 1 and 5 show a mirror angle of 45 degrees; however, any mirror plate angle within limits will work. As the mirror plate angle is increased, (for example from 45 degrees to 60 degrees), the mid-section height will decrease.

As discussed above, the mirror plate angle and thickness are selectable within limits, however, both mirror plates must be precisely at the same mirror plate angle chosen and have the same thickness.

Once the mirror plate thickness and angle have been chosen, the connector mid-section dimensions can be determined and the sections fabricated to provide the overall dimensions determined by design.

Joining & Boring

With final preparation of the three connector body sections, the three sections must be joined by mechanical means to provide a precise reference fit for subsequent operations. One method, as depicted in FIG. 2, is to drill and tap to connect the top section to the mid-section and the bottom section to the mid-section by screws offset to prevent interchanging the top and bottom sections at a later time.

After the three sections are firmly joined by mechanical means, the body is bored through the entire length at the parting lines with holes of a diameter equal to the cladding of the optical wave guide to be connected and in number equal to the number of fibers to be connected. It is essential that the spacing and vertical alignment of top holes be matched to those of the bottom row as precisely as possible.

One essential requirement of the MR3PC is that the input and output fibers must be held firmly in place prior to cutting in the field and at all times thereafter. In addition, a requirement exists for ejecting and removing the excess fiber on the opposite side of the guillotine cutting surface. (For example, the output fiber shown in the lower part in FIG. 1 must be held firmly in place and retained in position to the right of the guillotine. The excess fiber to the left of the guillotine must be ejected as it is cut and removed).

The above requirements can be met in a number of ways. Several methods are: (1) Bore the fiber holes several micrometers larger than the outside diameter of the fiber cladding that will be used. During assembly in the field, prior to cutting the fibers, apply a layer of cement to the fiber bore holes where fiber retention is required and lubricant where ejection is desired; (2) bore the fiber holes slightly undersize in the part of the connector block where fiber retention is required to cause a slight press fit during assembly of the connector in the field and slightly oversize in the part of the connector block where ejection of the excess fiber is desired.

Mirror Plate Slots

The mirror plate slots in the body of the connector assembly can be fabricated and finished to tolerance by a variety of current manufacturing techniques. Two requirements are that: (1) The mirror plate slots both be at the same precise mirror plate angle selected by design, and (2) the mirror plate slot thickness be slightly larger than the thickness selected by design for the mirror plate.

Mirror Plates

For use with single-mode fibers, the mirror plates can be entirely composed of glass having the same index of refraction as the core of the fibers to be connected. Since the light beam in single mode fiber travels parallel to the fiber axis, the short distance travelled through the mirror plates will not necessitate jacketing of the light beam with glass of a lower index of refraction as used in the cladding. The mirror plate can be constructed of multiple materials. The only portion of the plate requiring glass of the correct index of refraction is that part which the light beam passes through. Other areas of the plate can be made of any other material as long as the material selected can in some way be joined to the glass portion.

For multi-mode step index and multi-mode graded index fibers, which have a much larger core diameter than single-mode fibers and multiple light paths, the mirror plates can be constructed of glass having an index of refraction equal to that of the fiber cladding. The mirror plates can then be bored and filled with glass having an index of refraction equal to that of the fiber core in the area shown by dotted lines in FIG. 5.

Mirror Plate Alignment

The top and bottom connector sections have two screw holes drilled and tapped for set screws to retain the mirror plates as shown in FIG. 1.

The retention screws serve three purposes: (1) To hold the mirror plates in place for mirror plate targeting in such a manner that subsequent removal and replacement of the mirror plates will allow the same precise location as initially established; (2) to press the mirror plates firmly in contact with the cut fibers; and (3) to press the mirror plates against each other in the connector mid-section in order to eliminate any air gap between mirror plates.

To accomplish the above, the mirror set screw holes are drilled and tapped, the set of screws (designed with a cone shaped end) are inserted, the fabricated mirror plates (designated for the connector and marked for top and bottom) are inserted and held firmly in place while the set screws are tightened to mark the mirror plates. The mirror plates are then removed, the marked areas bored to a cone shape to match the set screw ends and the mirror plates are then reinstalled into the connector and locked into place for targeting.

Mirror Plate Targeting and Finishing

After the mirror plates are locked into place with the set screws, the mirror plates can be targeted to determine the point where the fiber core centerline will impinge on the plate glass. This can be accomplished by using a laser device or some other suitable device aimed through the back side of the fiber bore holes as indicated in FIG. 1. After pin point marking of the mirror plates for each input and output fiber, the mirror plates are removed and the surface area that each fiber core will contact with the mirror plate can be scribed. The marked areas are then ground to encompass an area which is slightly larger than that expected from fiber core contact in order to compensate for core eccentricity and diameter variations. The areas are ground to provide a slight curvature in the glass that in turn will produce a slight narrowing of the light beam. The ground and polished areas in contact with air as the preferred embodiment will provide a highly reflective surface. Other transparent materials with an index of refraction lower than that of the mirror plates can be plated to the prepared surfaces to provide total internal reflection of the optical signal.

Guillotine

The major objectives of the guillotine are to provide a clean cut to the optical fibers that are locked into place in the connector, to cut the optical fibers at precisely the same angle as the mirror plate angle, and to cut the optical fibers flush with the contact surface of the mirror plate.

The lower half of FIG. 1 shows the output optical fiber in place and the guillotine cutting into the cladding of the fiber. A number of approaches to guillotine design can be taken to achieve the above objectives.

One important aspect of guillotine design is to assure that the cutting edge of the guillotine is held flush with the surface of the mirror slot where the mirror plate will be in contact with the fiber core. One approach to accomplish this would be to make the guillotine sufficiently thick so that a snug fit in the mirror plate slot is provided. Another possibility is to arrange the design of the guillotine and mirror set screws such that with the guillotine in place touching the fibers, the set screws are tightened slightly to press the guillotine firmly against the mirror plate slot surface where a flush fit is desired. A sharp rap with a wooden mallet should then provide the desired cutting action.

A variety of guillotine designs will accomplish the objectives stated earlier. The most obvious is an extremely thin flat blade such as a razor blade. Another possibility is the guillotine shown in FIG. 3 which would enhance obtaining the proper angle of cut by scoring the sides of the waveguides prior to cutting and separation. A third approach presented here is shown in FIG. 4 and employs a thin high resistance wire heated by an electrical current. The heated wire positioned slightly ahead of the guillotine cutting edge melts the glass fiber while the blade provides separation, cleaning and cooling action.

Field Assembly

Fiber connection in the field will not require high technical training or the use of precision instruments with the MR3PC.

The technician will complete the following simple steps; separate top section of connector from mid section, insert the input fiber or fibers in the mid-section grooves, reinstall the top section and tighten firmly, cut fiber or fibers with guillotine provided, repeat the above for bottom section output fiber or fibers, insert the mirror plates provided and marked for top and bottom, and lock mirror plates into place.

I claim:

1. An optical fiber connector used to join like optical fiber waveguides and comprising:

an assembly containing optical fiber input and output ports where, for the purpose of defining orientation for all further discussion, all input optical fibers enter on the left side of said connector while all output optical fibers leave on the right side of said connector;

three sections designated as top, mid and bottom with each section having the same length and width, the height and size of each section determined by design application, the three sections joined in a manner to permit disassembly and reassembly to the original manufactured configuration;

input and output fiber ports formed along the entire length at the parting lines of said sections to accept one or more input optical fibers between the top and mid sections and a corresponding number of output optical fibers between the bottom and mid sections;

input and output fiber ports parallel to each other and in precise vertical alignment with each other;

input and output mirror plate slots oriented across the connector width along a line that is perpendicular to the optical fiber longitudinal axis and formed to pass through the respective input and output fiber ports at a preferred design angle of 45 degrees to the respective input and output optical fiber longitudinal axis and to a depth sufficient to cause parallel overlap between said slots in the connector mid section;

input fiber port(s) sized to firmly clamp the input optical fiber(s) to the left of the input mirror plate slot while permitting the input fiber cutoff section(s) to the right of the input mirror plate slot to slide freely within said fiber port(s);

output fiber port(s) sized to firmly clamp the output optical fiber(s) to the right of the output mirror plate slot while permitting the output fiber cutoff section(s) to the left of the output mirror plate slot to slide freely within said fiber slot(s);

input and output mirror plates marked and indexed to prevent interchange and sized to fit snugly in the respective mirror plate slots, said mirror plates parallel and overlapping in the connector mid section in such a manner as to provide a continuous refractive path for the reflected optical light signal(s) through both mirror plates;

mirror plates fabricated such that as a minimum, those portions which transmit the optical light signal consist of the same type of transparent material with the same index of refraction as that of the optical fiber core material and where light scattering is a problem, the remaining portions of the mirror plates consist of transparent material having the same index of refraction as that of the optical fiber cladding material;

mirror plates that provide highly reflective surfaces to the optical light signal when in contact with the transparent substance air which has a lower index of refraction than that of the mirror plate material which transmits the optical light signal;

mirror plates having slightly concave reflective surfaces formed at desired locations as determined by targeting the centerline of the respective optical fiber ports, the reflective surfaces sizes slightly larger than the surface imposed by the maximum calculated optical fiber core endface in contact with the mirror plate;

guillotines sized to fit snugly in the mirror plate slots and designed to achieve a clean smooth cut to the end surface of input and output optical fibers at the precise design angle;

setscrews to lock the mirror plates in place and to position said mirror plates in the same precise alignment to each other and to the respective input and output optical fibers at all times while also providing a tight flush fit of the mirror plates with said optical fiber end surfaces and with respect to each other.

2. An optical fiber connector in accordance with claim 1 which provides:

means to clamp optical fibers in position relative to each other for indirect joining prior to endface preparation by cutting and during all subsequent joining operations;

means to prevent optical fiber endface contamination from human contact during the cutting and joining operation;

means to target the center of the mirror plate reflecting surfaces to the center of the respective optical fiber ports during fabrication;

means to cut the input and output optical fibers while locked in place within said connector at the precise design angle;

means to eject and remove the cutoff fiber sections without disturbing the position of the retained optical fibers;

means to lock in place the input and output reflecting mirror plates in the same exact position during field assembly as during targeting and fabrication;

means to reflect the optical light signal traveling through said mirror plates;

means to cause the reflected optical light signal to slightly converge during passage through said mirror plates;

means to compensate for optical fiber manufacturing dimensional discrepancies that affect accurate joining of optical fibers;

means to accurately transmit the optical light signal leaving the end of each input optical fiber through the connector mirror plates and into the core of the respective output optical fiber without loss of light signal.

3. An optical fiber connector in accordance with claim 1 wherein:

the method of joining like optical fibers is by indirect means allowing the optical light signal from the core of an optical fiber to impinge on a reflecting area that is larger than that of the fiber core itself while the concave shape of the reflecting surface converges the light beam into a smaller cross sectional area prior to its entry into the core of a respective mating optical fiber.

* * * * *